(12) United States Patent
Jiang et al.

(10) Patent No.: US 11,419,137 B2
(45) Date of Patent: Aug. 16, 2022

(54) TRANSMISSIONS BASED ON SCHEDULING INDICATIONS

(71) Applicant: ZTE Corporation, Guangdong (CN)

(72) Inventors: Chuangxin Jiang, Guangdong (CN); Hao Wu, Guangdong (CN); Yu Ngok Li, Guangdong (CN); Shujuan Zhang, Guangdong (CN); Nan Zhang, Guangdong (CN); Zhaohua Lu, Guangdong (CN); Yijian Chen, Guangdong (CN)

(73) Assignee: ZTE Corporation, Guangdong (CN)

( * ) Notice: Subject to any disclaimer, the term of this patent is extended or adjusted under 35 U.S.C. 154(b) by 74 days.

(21) Appl. No.: 17/019,085

(22) Filed: Sep. 11, 2020

(65) Prior Publication Data

US 2020/0413433 A1 Dec. 31, 2020

Related U.S. Application Data

(63) Continuation of application No. PCT/CN2018/078879, filed on Mar. 13, 2018.

(51) Int. Cl.
*H04W 72/12* (2009.01)
*H04L 5/00* (2006.01)
*H04W 72/04* (2009.01)

(52) U.S. Cl.
CPC ....... *H04W 72/1289* (2013.01); *H04L 5/0048* (2013.01); *H04W 72/0446* (2013.01); *H04W 72/0453* (2013.01)

(58) Field of Classification Search
CPC ......... H04W 72/1289; H04W 72/0446; H04W 72/0453; H04L 5/0048; H04L 5/0051; H04L 1/0072; H04L 1/0045
See application file for complete search history.

(56) References Cited

U.S. PATENT DOCUMENTS 9,398,123 B2 * 7/2016 Vermani ............... H04L 69/323
9,854,596 B2 * 12/2017 Calcev ............. H04W 74/0816
(Continued)

FOREIGN PATENT DOCUMENTS

CN 106993332 A 7/2017
CN 107295676 A 10/2017
(Continued)

OTHER PUBLICATIONS

European Search Report, EP Application No. 18909703.3, dated Feb. 18, 2021, 9 pages.
AT&T: "Two Stage DCI Design for NR DL Control Channel", 3GPP Draft; R1-1702274 Two Stage DCI Design for NR DL Control Channel, 3rd Generation Partnership Project (3GPP), Feb. 13-17, 2017, 6 pages.
(Continued)

*Primary Examiner* — Jay P Patel
(74) *Attorney, Agent, or Firm* — Perkins Coie LLP

(57) ABSTRACT

Methods, systems, and devices related to related to a two-stage transmission of downlink control messages for reducing signaling overhead are described. In one representative aspect, a method for wireless communication includes receiving, at a mobile device, a message from a wireless communication node. The message includes a first portion of a scheduling indication for scheduling a transmission. The method also includes determining, by the mobile device, a second portion of the scheduling indication based on one or more predetermined rules; determining, by the mobile device, the scheduling indication based on the first portion of the scheduling indication included in the message and the second portion of the scheduling indication; and performing, by the mobile device, the transmission based on the scheduling indication.

20 Claims, 6 Drawing Sheets

(56) References Cited

U.S. PATENT DOCUMENTS

| | | | | |
|---|---|---|---|---|
| 10,356,778 B2* | 7/2019 | Tseng | ............... | H04W 72/042 |
| 10,433,326 B2* | 10/2019 | Zhang | ............... | H04W 72/1257 |
| 10,462,629 B2* | 10/2019 | Bhattad | ............... | H04W 72/048 |
| 2009/0175388 A1 | 7/2009 | Chang et al. | | |
| 2013/0230028 A1* | 9/2013 | Calcev | ............. | H04W 74/0816 |
| | | | | 370/336 |
| 2016/0119455 A1* | 4/2016 | Stacey | ............... | H04L 1/1614 |
| | | | | 370/336 |
| 2017/0332377 A1* | 11/2017 | Tseng | ............... | H04W 74/006 |
| 2017/0359849 A1* | 12/2017 | Zhang | ............... | H04W 72/1257 |
| 2018/0220257 A1* | 8/2018 | Bhattad | ............... | H04W 4/70 |
| 2019/0230694 A1* | 7/2019 | Lyu | ............... | H04W 72/1273 |
| 2020/0022155 A1* | 1/2020 | Zhu | ............... | H04W 72/1205 |
| 2020/0029193 A1* | 1/2020 | Bhattad | ............... | H04W 72/048 |

FOREIGN PATENT DOCUMENTS

| | | | | |
|---|---|---|---|---|
| EP | 3282615 A | 2/2018 | | |
| WO | WO-2009117578 A1 * | 9/2009 | ............ | H04L 1/0045 |
| WO | WO-2009120301 A2 * | 10/2009 | ......... | H04N 21/2368 |
| WO | WO-2017166228 A1 * | 10/2017 | ............... | H04L 1/18 |
| WO | WO-2017218182 A1 * | 12/2017 | ......... | H04W 52/0216 |
| WO | WO-2019222922 A1 * | 11/2019 | ............. | H04L 5/001 |

OTHER PUBLICATIONS

International Search Report, PCT/CN2018/078879, dated Nov. 16, 2018, 6 pages.

NTT Docomo, Inc. "RAN WG's progress on NR WI in the October meeting 2017" 3GPP TSG-RAN WG2 #100 R2-1712305, Dec. 1, 2017.

* cited by examiner

TRANSMISSIONS BASED ON SCHEDULING INDICATIONS

CROSS-REFERENCE TO RELATED APPLICATION(S)

This patent document is a continuation of and claims benefit of priority to International Patent Application No. PCT/CN2018/078879, filed on Mar. 13, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to a two-stage transmission of downlink control messages for reducing signaling overhead.

In one representative aspect, a method for wireless communication is disclosed. The method includes receiving, at a mobile device, a first message from a wireless communication node. The first message includes a first portion of a scheduling indication for scheduling a transmission. The method also includes determining, by the mobile device, a second portion of the scheduling indication based on one or more predetermined rules; determining, by the mobile device, the scheduling indication based on the first portion of the scheduling indication included in the message and the second portion of the scheduling indication; and performing, by the mobile device, the transmission based on the scheduling indication.

In another representative aspect, a method for wireless communication is disclosed. The method includes determining, by a wireless communication node, a first portion of a scheduling indication, wherein the scheduling indication is for scheduling a transmission; transmitting, from the wireless communication node, a first message to a mobile device. The first message including the first portion of the scheduling indication. The method also includes receiving, at the wireless communication node, a transmission from the mobile device according to the scheduling indication. The scheduling indication is obtained by the mobile device by combining the first portion of the scheduling indication included in the first message and the second portion of the scheduling indication determined based on one or more predetermined rules.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

With the continuous development of wireless communication technologies, a wide range of wireless communication services are emerging, which will greatly increase the demand for bandwidth in wireless communication systems. The development of the new generation of wireless communication—5G New Radio (NR) communication—is a part of an ongoing mobile broadband evolution process to meet the requirements of increasing network demand.

Figure 1:
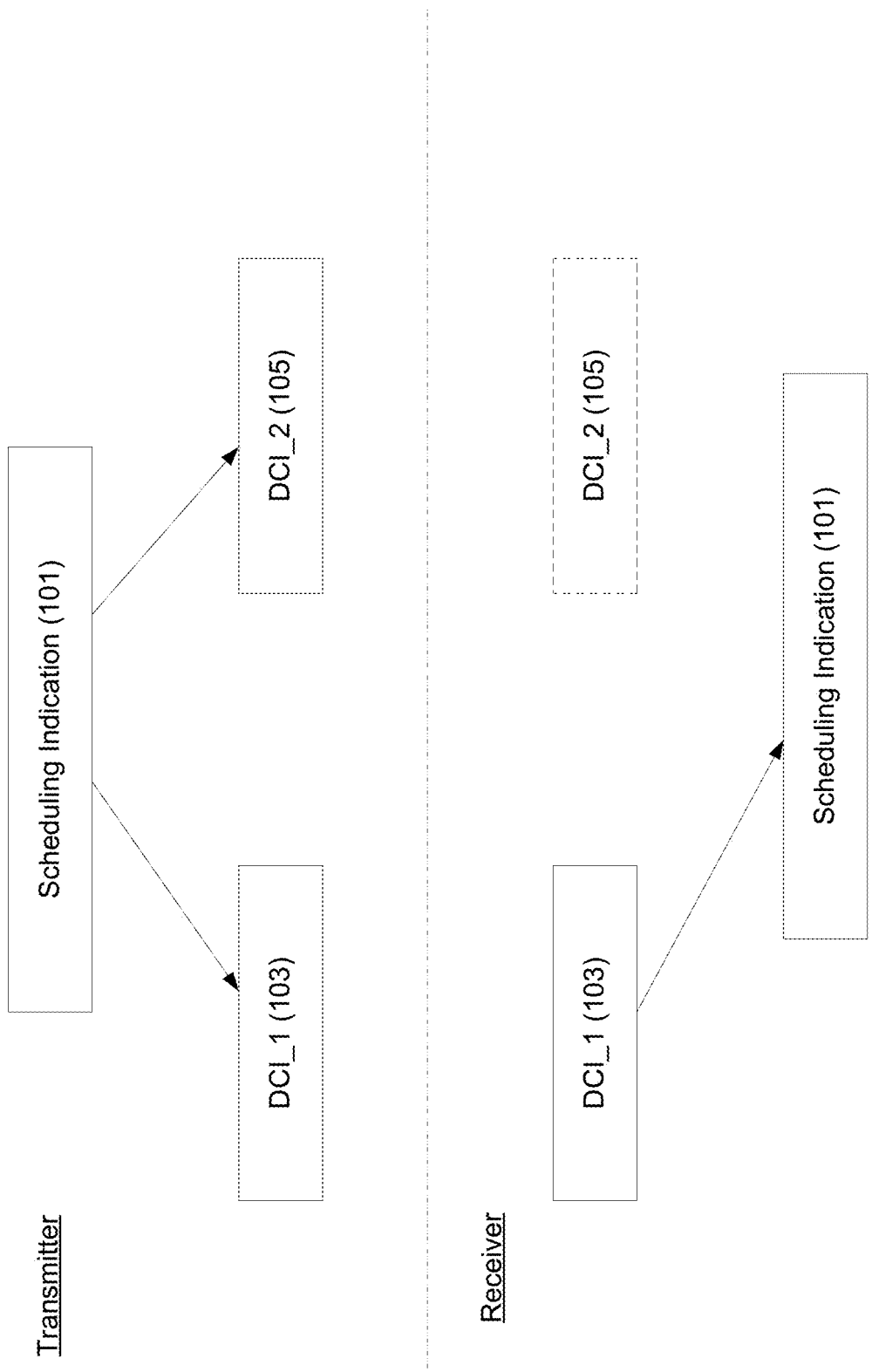
FIG. 1 is a schematic illustration of an example of a two-stage downlink control message transmission.

The NR technology provides a more flexible network architecture than the technology provided by the current Long-Term Evolution (LTE) or earlier systems. To support the flexibility offered by the NR technology, the amount of information carried by control messages, such as the Downlink Control Indication (DCI) messages, can become too large. Because some control messages are transmitted at a high repetition rate (e.g., 100 or 1000 times a second), every extra bit in the message may have a significant impact on the bandwidth overhead. In addition, when the payload of the DCI message gets too large, the robustness of transmissions on the Physical Downlink Control Channel (PDCCH) may be impacted (e.g., due to burst errors in transmission). Thus, in some scenarios, a two-stage transmission of the DCI message can be used. For example, as shown in FIG. 1, the scheduling indication 101 of a transmission can be split into two portions. Each portion is carried by an individual DCI message: DCI_1 (103) and DCI_2 (105). Thus, the payload for each DCI message (e.g., each portion) is more suitable for robust transmissions on the PDCCH. Here, the scheduling indication 101 is an indicator indicating one or more scheduling parameters for scheduling a transmission. The scheduling indication 101 can include one or more of at least one of the following types of information: a precoder indication, a Modulation and Coding Scheme (MCS) index, a Redundancy Version (RV) value, a New Data Indicator, a Code Block Group Transmission Information (CBGTI), a Phase-Tracking Reference Signal (PTRS) and Demodulation Reference Signal (DMRS) association, a Channel State Information (CSI) request, or a Sounding Reference Signal (SRS) request. In particular, the precoding indication can include at least one of the following: a port set or port set group selection, a beam selection, a co-phasing value, SRS Resource Indicator (SRI), or Transmitted Rank Indicator (TRI).

The two-stage transmission scheme, however, may increase DCI signaling overhead. In some cases, when a single DCI message is sufficient to carry the key scheduling indication, the information carried by the second DCI message may not be essential for scheduling the subsequent transmission. Then the second DCI may not be transmitted. In some cases, the second DCI message may fail to transmit successfully—a re-transmission of the second DCI message can further increase the signaling overhead. The present document describes techniques that can be used in various embodiments to obtain the scheduling indication based on a single DCI message (when the second portion is not received or detected successfully) when the two-stage DCI transmission scheme is used.

Figure 2A:
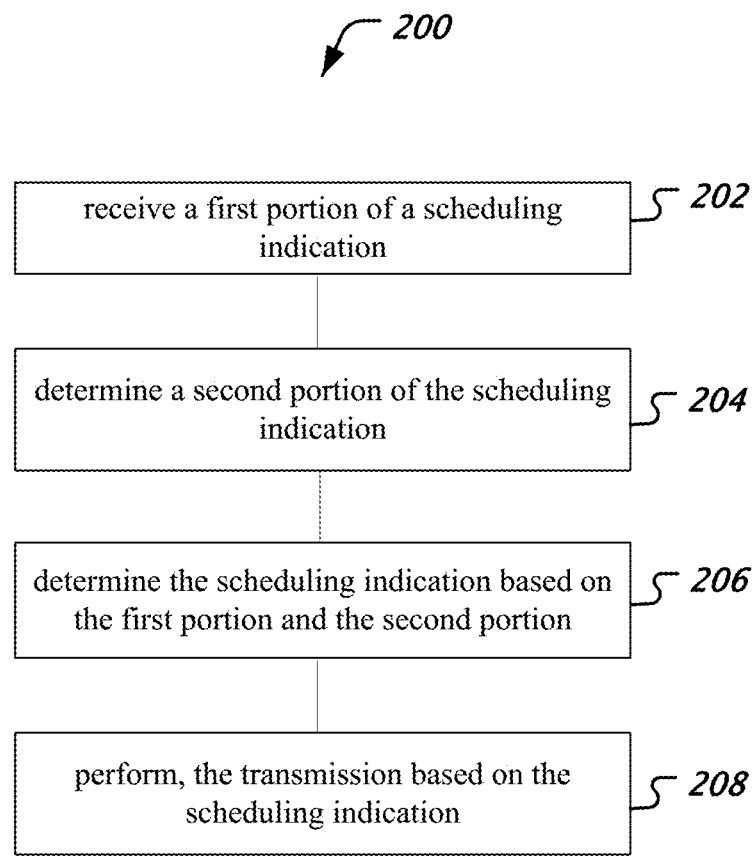
FIG. 2A is a flow chart representation of an example of a method for wireless communication.

FIG. 2A is a flow chart representation of a method 200 for wireless communication. The method 200 includes, at 202, receiving, at a mobile device, a first message from a wireless communication node. The first message includes a first portion of a scheduling indication for scheduling a transmission. The method 200 includes, at 204, determining, by the mobile device, a second portion of the scheduling indication based on one or more predetermined rules. The method 200 includes, at 206, determining, by the mobile device, the scheduling indication based on the first portion of the scheduling indication included in the first message and the second portion of the scheduling indication. For example, as described in the present document, it may be possible to determine the scheduling indication without having received the second indication, simply using the first indication, and a set of rules that are pre-determined, or possibly communicated to the mobile device via a higher layer message from the base station. The method also includes, at 208, performing, by the mobile device, the transmission based on the scheduling indication.

In some embodiments, the determining the second portion of the scheduling indication is performed in response to detecting a failure of reception of the second portion from the wireless communication node. The failure of reception indicates one of (a) a non-reception of a second message that includes the second portion within a predetermined time interval, or (b) a reception error for receiving the second message that includes the second portion. In some implementations, the first message includes information indicating a transmission of the second message from the wireless communication node. Then the failure of reception of the second portion can be indicated by the first message.

In some embodiments, the scheduling indication includes one or more of at least one of the following: a precoder indication, a Modulation and Coding Scheme (MCS) index, a Redundancy Version (RV) indicator, a New Data Indicator, a Code Block Group Transmission Information (CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request. In some embodiments, the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

In some embodiments, the transmission uses only one codeword or only one transmission block, and wherein the second portion of the scheduling indication is empty.

In some embodiments, the transmission is to be performed on a frequency band that includes multiple sub-bands, and wherein the first portion of the scheduling indication includes wideband information for the frequency band. In some implementations, the second portion of the scheduling indication includes sub-band indicators for all the multiple sub-bands, each of the sub-band indicators indicating a scheduling parameter for scheduling the transmission to occur in a corresponding sub-band. In some embodiments, the determining the second portion of the scheduling indication comprises selecting, for each of the multiple sub-bands, a value from a set of candidate indicator values as a sub-band indicator, wherein the set of candidate indicator values is known a priori to the mobile device or is configured by a higher-layer signaling message.

In some embodiments, the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band. In some implementations, a number of sub-band indicators in the first set is known a priori to the mobile device or is configured by a higher-layer signaling message. In some embodiments, the determining the second portion of the scheduling indication comprises using the first set of sub-band indicators to the second subset of sub-bands. In some embodiments, the determining the second portion of the scheduling indication comprises selecting, for each of the second subset of sub-bands, a value from a set of candidate indicator values as a sub-band indicator, wherein the set of candidate indicator values is known a priori to the mobile device or is configured by a higher-layer signaling message.

In some embodiments, a number of sub-band indicators in the second set is indicated by the first message or by a higher-layer signaling message. In some embodiments, a number of sub-band indicators in the second set is determined based on a number of scheduled resources in frequency domain in the transmission band. In some implementations, the number of sub-band indicators in the second set is determined based on the number of scheduled resources in frequency domain in the transmission band and a number of sub-band indicators in the first set. Usually, the information of scheduled resources in frequency domain is indicated by the first message.

In some embodiments, the first portion of the scheduling indication includes information that changes frequently in time domain. In some embodiments, the determining the second portion of the scheduling indication comprises determining the second portion of the scheduling indication based on a scheduling parameter for a previous slot in time domain. The second portion of the scheduling indication is empty in the current slot.

In some embodiments, the first portion of the scheduling indication includes information for indicating a set of candidate values for a scheduling parameter, and the second portion of the scheduling indication includes information for selecting a value from the set of candidate values for the scheduling parameter.

Figure 2B:
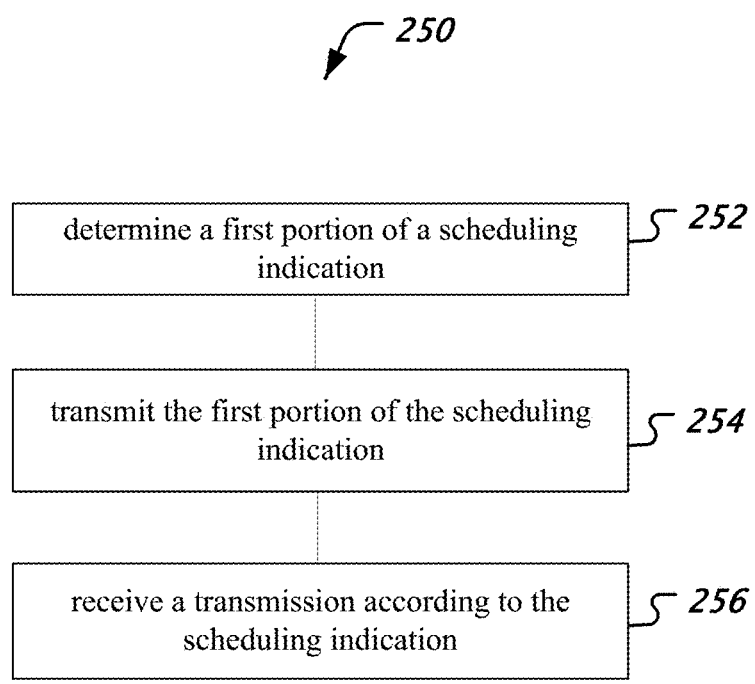
FIG. 2B is a flow chart representation of another example of method for wireless communication.

FIG. 2B is a flow chart representation of a method 300 for wireless communication. The method 259 includes, at 252, determining, by a wireless communication node, a first portion of a scheduling indication, wherein the scheduling indication is for scheduling a transmission. The method 250 includes, at 254, transmitting, from the wireless communication node, a message to a mobile device. The message includes the first portion of the scheduling indication. The method 250 also includes, at 256, receiving, at the wireless communication node, a transmission from the mobile device according to the scheduling indication. The scheduling indication is obtained by the mobile device by combining the first portion of the scheduling indication included in the message and a second portion of the scheduling indication determined based on one or more predetermined rules.

In some embodiments, the method includes determining, by a wireless communication node, a second portion of a scheduling indication; and transmitting, from the wireless communication node, a second message to the mobile device, the second message including the second portion of the scheduling indication. In some implementations, the first message includes information indicating the transmitting of the second message to the mobile device. In some embodiments, the second portion of the scheduling indication is determined by the mobile device in response to detecting a failure of reception of the second portion by the mobile device from the wireless communication node, the failure of reception indicating one of (a) a non-reception of a second message that includes the second portion within a predetermined time interval, or (b) a reception error for receiving the second message that includes the second portion.

In some embodiments, the scheduling indication includes one or more of at least one of the following: a precoder indication, a Modulation and Coding Scheme (MCS) index, a Redundancy Version (RV) indicator, a New Data Indicator, a Code Block Group Transmission Information (CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request. In some implementations, the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

In some embodiments, the transmission uses only one codeword or only one transmission block, and wherein the second portion of the scheduling indication is empty.

In some embodiments, the transmission is to be performed on a frequency band that includes multiple sub-bands, and wherein the first portion of the scheduling indication includes wideband information for the frequency band. In some implementations, the second portion of the scheduling indication includes sub-band indicators for all the multiple sub-bands, each of the sub-band indicators indicating a scheduling parameter for scheduling the transmission to occur in a corresponding sub-band. In some embodiments, the second portion of the scheduling indication is determined by selecting, for each of the multiple sub-bands, a value from a set of candidate indicator values as a sub-band indicator, wherein the set of candidate indicator values is known a priori to the wireless communication node or is configured by a higher-layer signaling message.

In some embodiments, the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band. In some implementations, a number of sub-band indicators in the first set is known a priori to the mobile device or is configured by a higher-layer signaling message. In some embodiments, the second portion of the scheduling indication is determined by using the first set of sub-band indicators for the second subset of sub-bands. In some implementations, the second portion of the scheduling indication is determined by selecting, for each of the second subset of sub-bands, a value from a set of candidate indicator values as a sub-band indicator, wherein the set of candidate indicator values is known a priori to the mobile device or is configured by a higher-layer signaling message.

In some embodiments, the number of sub-band indicators in the second set is indicated by the first message or by a higher-layer signaling message. In some embodiments, the number of sub-band indicators in the second set is determined based on the number of scheduled resources in frequency domain in the transmission band. In some implementations, the number of sub-band indicators in the second set is determined based on the number of scheduled resources in frequency domain in the transmission band and the number of sub-band indicators in the first set.

In some embodiments, the first portion of the scheduling indication includes information that changes frequently in time domain. In some implementations, the second portion of the scheduling indication is determined based on a scheduling parameter for a previous slot in time domain.

In some embodiments, the first portion of the scheduling indication includes information for indicating a set of candidate values for a scheduling parameter, and the second portion of the scheduling indication includes information for selecting a value from the set of candidate values as an indicator for the scheduling parameter.

Details of the disclosed techniques are described in the following embodiments.

Example Embodiment 1

This embodiment describes techniques that can be used for transmitting information such as CSI request, SRS requests, or other types of requests.

In the NR systems, CSI can be triggered by various triggering states. Currently, a DCI message reserves up to $N_{TS}=6$ bits for the CSI request field. $N_{TS}$ can be configured by higher-layer signaling (e.g., using parameter ReportTriggerSize) so that $N_{TS} \in \{0, 1, 2, 3, 4, 5, 6\}$. The CSI request field then can be used to indicate $2^{N_{TS}}-1=63$ states for triggering CSI (state 0 indicates that no CSI request has been made).

However, reserving six bits in both DCI_1 and DCI_2 messages may not be necessary. The $N_{TS}$ bits can be split into two portions: $N_{TS}^1$ bits can be included in DCI_1 and $N_{TS}^2$ bits can be included in DCI_2.

On the receiver side, when a user equipment (UE) detects both DCI_1 and DCI_2 successfully, the UE can determine the triggering state based on both DCI_1 and DCI_2. When the UE fails to receive DCI_2 successfully (e.g., when there is a transmission error or the UE fails to decode DCI_2, or the base station does not transmit DCI_2), only one of $2^{N_{TS}}-1$ states can be triggered.

For example, $N_{TS}=4$, so $2^{N_{TS}}-1=15$ triggering states are available. $N_{TS}^1=2$, and $N_{TS}^2=2$. A triggering state value 0010 needs to be transmitted to the UE. The triggering state value can be split into two portions: 00, and 10. DCI_1 includes the lower two bits of the value 10, and DCI_2 includes the higher two bits of the value 00. The UE receives DCI_1 with value 10. However, if the UE fails to receive DCI_2, the UE can use the value in DCI_1 to determine the triggering state of the first four states because of 2 bits are used (state 0 indicates no request). If the UE detects DCI_2 successfully, total $N_{TS}=4(N_{TS}^1+N_{TS}^2)$ bits can be used and one of 16 states can be selected.

It is noted that this embodiment focuses on CSI request, but the techniques can also be applied to SRS request and other types of request.

Example Embodiment 2

This embodiment describes techniques that can be used for transmitting information such as the PTRS-DMRS association.

The PTRS-DMRS association is used to indicate which DMRS port is associated with a transmitted PTRS port. For example, four DMRS ports are supported, thus two bits of PTRS-DMRS association are used to indicate the association between the transmitted PTRS port and one of four DMRS ports. For example, bit value 00, 01, 10 and 11 represent the PTRS port is associated with DMRS port 0, 1, 2 and 3 respectively.

To reduce signaling overhead, the PTRS-DMRS association can be included only in DCI_2. When the UE receives DCI_2 successfully, the PTRS-DMRS association is indicated by the scheduling indication in DCI_2. When the UE fails to receive DCI_2, the UE can determine the PTRS-DMRS association based on a set of predetermined rules. For example, it can be assumed that the PTRS port is associated with the DMRS port with the lowest port index. Thus, there is no need to re-transmit DCI_2 when DCI_2 fails to transmit, thereby reducing signaling overhead that can be caused by retransmissions. If two PTRS ports are transmitted, in the case when the UE fails to receive DCI_2, one PTRS port can be predefined to associate with the DMRS port with lowest DMRS port index among DMRS ports share the same PTRS port.

Scheduling Indication for Codewords (CWs) and/or Transmission Blocks (TBs)

With the advance of wireless communication technology, two or more CWs and/or TBs can be supported in uplink transmissions. Signaling all the required information for all the supported CWs and/or TBs may cause the DCI payload to be too large. Thus, a two-stage DCI transmission is desirable, and the scheduling indication can be partitioned according to CWs and/or TBs.

Example Embodiment 3

This embodiment describes techniques that can be used in embodiments for transmissions of MCS/RV/NDI fields.

Currently, both LTE and NR systems reserve five bits for the MCS field, two bits for the RV field, and one bit for the NDI field. To support the scheduling of two TBs, 8×2=16 bits are needed even when only one TB is dynamically enabled in some slots.

It is thus desirable to include the scheduling indication (e.g., MCS/RV/NDI fields) for the first TB in the first DCI (e.g., DCI_1) and the scheduling indication for the second TB in the second DCI to reduce signaling overhead. When the second TB is not used for the transmission (e.g., for transmissions having less than four layers), in some embodiments, only one DCI message (DCI_1) needs to be transmitted. In some embodiments, both DCI_1 and DCI_2 can be transmitted when only one TB is scheduled.

On the receiver side, when the UE detects both DCI_1 and DCI_2 successfully, the UE can assume that two TBs may be used (the actual number of scheduled TBs is still based on the other information, such as the values of MCS and RV). When the UE fails to receive DCI_2 within a predetermined period of time, the UE can assume that only one TB is used. In some cases, when the UE receives DCI_2 but fails to decode it successfully, the UE can obtain the MCS/RV/NDI fields for the second TB based on a set of predetermined rules. It is also possible that DCI_2 can be detected successfully when only one TB is scheduled. The second TB can be enabled or disabled, and DCI_1 can include information (e.g., MSC/RV=0 or 1) to indicate whether the corresponding TB is disabled or enabled.

Example Embodiment 4

This embodiment describes techniques that can be used for transmitting DMRS port indications.

In some embodiments, the DMRS port indication can be included in DCI_1 only. Depending on whether the UE receives the DCI_2 message, the scheduling information can be used for either one TB/CW cases or two TB/CW cases.

Table 1 shows representative values for indicating DMRS ports in one codeword and two codewords cases. For example, when DCI_2 is not detected successfully by the UE, the UE can assume that only one TB is scheduled. The DMRS port indication in DCI_1 can provide DMRS port information for the one-CW case. When DCI_2 is detected successfully, the UE can assume that both TBs are scheduled. The DMRS port indication in DCI_1 then provide DMRS port information for the two-CW case. For example, the value 2 in Table 1 means DMRS port 0,1 for one TB (one CW) enabled cases, but means DMRS port 0,1,2,3,4,5,6 for the two TB enabled cases.

TABLE 1

Representative Values for DMRS Ports in One Codeword and Two Codewords

| | One Codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |

Example Embodiment 5

This embodiment describes techniques that can be used in embodiments for transmitting CGBTI.

Currently, the DCI message includes N bits for the CBGTI field to indicate whether a CBG is re-transmission, with one bit corresponding to one CBG. When two TBs/CWs are scheduled, the N bits in CBGTI correspond to N CBGs in the two TBs/CWs. The first N/2 bits correspond to the first TB and the remaining N/2 bits corresponding to the second TB. When only one TB is used for transmissions, all N bits are still reserved for the CBGTI field. In other words, even only 1 CW or TB is scheduled, N/2 bits CBGTI are used for the CBGs of the enabled TB, the remaining N/2 bits are still reserved in DCI which are not used.

To reduce signaling overhead, the first N/2 bits can be included in DCI_1, and the remaining N/2 bits can be included in DCI_2. In the cases when the second TB is not used for the transmission, only one DCI message (i.e., DCI_1) needs to be transmitted.

On the receiver side, when the UE detects both DCI_1 and DCI_2 successfully, the UE can assume that two TBs are used. A total of N bits for CBGTI are reserved in DCI_1 and DCI_2. When the UE fails to receive DCI_2 within a predetermined period of time, the UE can assume that only one TB is used. In some cases, when the UE receives DCI_2 but fails to decode it successfully, the UE can obtain the CGBTI field for the second TB based on a set of predetermined rules. As compared to reserving N bits of CBGTI in DCI_1, the disclosed techniques can reduce signaling overhead by N/2 bits when only one TB is enabled.

Scheduling Indication for Sub-Bands

In the current wireless communication systems, two transmission schemes are supported for the Physical Uplink Shared Channel (PUSCH): codebook based transmission and non-codebook based transmission. For codebook based transmissions, the UE determines its PUSCH transmission precoder based on SRS Resource Indicator (SRI), Transmitted Rank Indication (TRI), and Transmitted Precoding Matrix Indicator (TPMI) fields in a Downlink Control Indicator (DCI) message.

For non-codebook based transmissions, the UE can determine its PUSCH precoder and transmission rank based on the wideband SRI field from the DCI. This is because, when channel reciprocity holds (i.e., both downlink and uplink transmission links match, such as in a time division duplexing, or TDD, channel), the channel estimation of the uplink direction at the transmitter can be used directly for link adaptation in the downlink direction.

To allow flexibility in frequency band selection, the scheduling indication can include information for the wideband as well as one or more sub-bands. The number of sub-bands on a channel depends on the scheduled resources, such as physical resource blocks (PRBs) or resource block groups (RBGs), and can vary dynamically. When the number of sub-bands becomes large, a large payload for the downlink control message can pose robustness issues for transmissions on channels.

In such cases, the scheduling indications for sub-bands can be split into two portions. The first portion includes the scheduling indication for the wideband and a subset of the sub-bands. The second portion includes the scheduling indication for the remaining sub-bands.

For example, when the number of PUSCH sub-bands is smaller than or equal to a threshold T, the scheduling indication for all the sub-bands can be included in DCI_1. There is no need to transmit DCI_2 for sub-band scheduling indication.

When the number of PUSCH sub-bands is larger than T (e.g., S>T), the scheduling indication for the wideband and the first T sub-bands can be included in DCI_1. The scheduling indication for the remaining S-T sub-bands can be included in DCI_2. When T=0, there is no sub-band indication in DCI_1. In some embodiments, information carried by DCI_1 may be fixed or may not change frequently. Thus, the payload size of DCI_1 can be constant for at least a predetermined duration of time. Parameter T can be configured by higher layer signaling or be known a priori to the base station and/or the UE, thereby maintaining flexibility in DCI signaling while reducing signaling overhead.

Example Embodiment 6

This embodiment describes representative techniques that can be used for codebook base transmissions.

Figure 3:
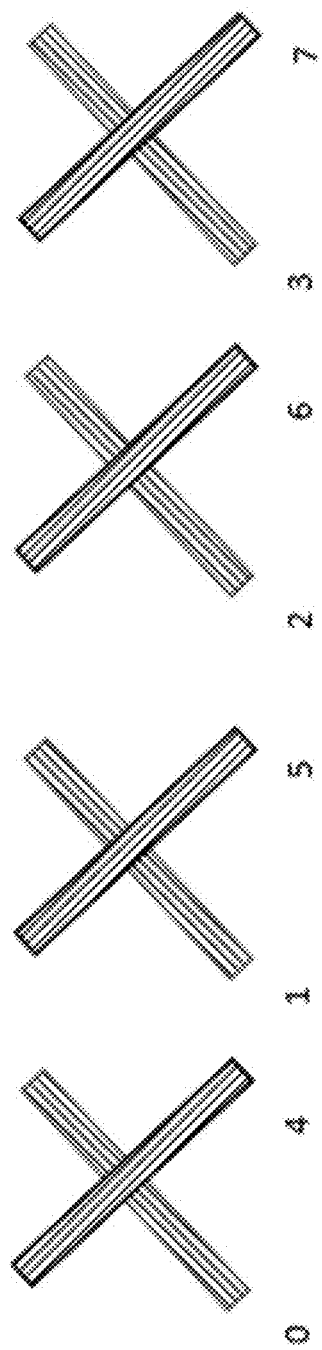
FIG. 3 is a schematic diagram of an example of a transmission pattern for eight antenna ports.

Currently, many UEs support up to four antenna ports for uplink transmissions. However, with the advances of wireless communication technology, UE can support more than four antenna ports (e.g., six, eight, or more antenna ports). FIG. 3 shows a schematic diagram of a transmission pattern for eight antenna ports. In this example, antenna ports {0, 4}, {1, 5}, {2, 6}, {3, 7} correspond to the first, second, third, and fourth pair of cross-polarization antennas respectively. One pair of cross-polarization antennas can be considered as one port pair.

For UEs with higher capability, uplink transmissions for one layer of rank-R ($1 \leq R \leq R_{max}$) can be performed using all available eight antenna ports. However, for UEs with lower capability, due to the difficulty in performing coherent uplink transmissions using all antenna ports, uplink transmissions for one layer can be performed using only a subset of antenna ports. Typically, if a transmission is performed using more than one but not all available antenna ports, the transmission is called a partial coherent transmission.

There are two categories of partial coherent transmissions for a UE that supports transmissions using up to eight antenna ports:

(1) Category 1: two-antenna partial coherent transmissions. The eight antenna ports are grouped into four coherent port sets: port set 0 includes ports {0, 4}, port set 1 includes ports {1, 5}, port set 2 includes ports {2, 6}, and port set 3 includes ports {3, 7}. The cross-polarization antenna ports in each set allow coherent transmissions by the UE.

(2) Category 2: four-antenna partial coherent transmissions. The eight antenna ports are grouped into two coherent port sets: port set 0 includes ports {0, 1, 4, 5} and port set 1 includes ports {2, 3, 6, 7}. The two pairs of cross-polarization antenna ports in each set allow coherent transmissions by the UE.

After obtaining UE's capabilities regarding partial coherent transmissions, the base station can indicate which port set(s) to be used for uplink transmissions. In addition to the port set selection, a co-phasing value $i_2$ indicating a phase difference between the two ports within the port set can be indicated to the UE. The co-phasing value can be a wideband indication, or an indication for a sub-band. For example, $i_2=0$ corresponds to the co-phasing value between port 0 and port 4.

For transmissions in Category 1, the quantities $p_{i_1}$ ($i_1=0, 1, 2, 3$) and $\varphi_n$ are given as:

$$p_0=[1\ 0\ 0\ 0]^T, p_1=[0\ 1\ 0\ 0]^T, p_2=[0\ 0\ 1\ 0]^T, p_3=[0\ 0\ 0\ 1]^T$$

$$\varphi_n=e^{j\pi n/2}$$

For rank-1 transmissions in Category 1, $i_1$ indicates the port set selection. That is, $i_1=0, 1, 2, 3$ represents port set 0, 1, 2, 3 respectively. The port set selection is a wideband indication that can be included in an uplink grant for the entire scheduled PUSCH.

The corresponding precoder W for rank-1 transmission is shown in Table 2, wherein t and n correspond to $i_1$ and $i_2$ respectively and M=8.

TABLE 2

Representative Uplink Rank-1 Codebook for Eight Antenna Ports

| $i_1$ | $i_2$ | |
|---|---|---|
| 0, 1, 2, 3 | 0, 1, 2, 3 | $W_{i_1,i_2}$ |

$$W_{t,n} = \frac{1}{\sqrt{M}} \begin{bmatrix} p_t \\ \varphi_n p_t \end{bmatrix}$$

Three types of cases may occur for rank-2 transmissions.

Case 1: One Port Set

In some cases, both layers can be transmitted by one port set because one port set can support two layers. For example, $i_1$ indicates the port set selection. The port set selection may be a wideband indication that can be included in an uplink grant for the entire scheduled PUSCH.

In addition to the port set selection, a co-phasing value $i_2$ indicating the phase difference between the two ports can be indicated to the UE in the DCI message. To reduce signaling overhead, $i_2$ can have only two values: 0 or 1. Limiting the value of $i_2$ may be useful when the channel condition of one port set is much better than others. However, the transmit power can be reduced by half because power sharing may not be done between two non-coherent port sets. The corresponding precoder W is shown in Table 3, wherein t and n correspond to $i_1$ and $i_2$ respectively and M=8.

TABLE 3

Representative Uplink Rank-2 codebook for Eight Antenna Ports

| $i_1$ | $i_2$ | |
|---|---|---|
| 0, 1, 2, 3 | 0, 1 | $W_{i_1,i_2}$ |

$$W_{t,n} = \frac{1}{\sqrt{2M}} \begin{bmatrix} p_t & p_t \\ \varphi_n p_t & -\varphi_n p_t \end{bmatrix}$$

Case 2: Two Port Sets

In some cases, transmission in the two layers are performed using two separate port sets. Value $i_1$ can be used to indicate port set selection. To allow flexibility in port set selections, $i_1$ can be used to indicate any two port sets from the four port sets. The total number of possibilities is $C_4^2=6$, thus the value of $i_1$ is in the range of [0, 5], with each value indicating a port set pair (t1, t2)=(0,1), (0,2), (0,3), (1,2), (1,3), or (2,3).

The co-phasing values in these cases are different than the values shown in Table 2 because transmissions using two separate port sets are non-coherent. To allow greater flexibility, i2 can have two parts: $i_{21}$ for the co-phasing value for layer 1, and $i_{22}$ for the co-phasing value for layer 2. Because two port sets transmit signal independently, the transmit power doubles the transmit power in the Case 1 mentioned above.

The corresponding precoder W is shown in Table 4, wherein $t_1$ and $t_2$ correspond $i_1$ for each rank, n correspond to $i_{21}$, m corresponds to $i_{22}$, and M=8.

TABLE 4

Alternative Uplink Rank-2 codebook for Eight Antenna Ports

| $i_1$ | $i_{21}$ | $i_{22}$ | |
|---|---|---|---|
| 0-5 | 0-3 | 0-3 | $W_{i_1,i_{21},i_{22}}$ |

$$W_{t_1,t_2,n,m} = \frac{1}{\sqrt{M}} \begin{bmatrix} p_{t_1} & p_{t_2} \\ \varphi_n p_{t_1} & \varphi_m p_{t_2} \end{bmatrix}$$

Case Three: One or Two Port Set(s)

Transmissions in the two layers can be performed using either one port set or two port sets. In such cases, values of $i_1$ are in a larger range [0, 9]. The range [0, 3] is used for the one port set cases, and the range [4, 9] is used for the two port sets cases. The values of $i_2$ also change according to $i_1$.

Based on the above discussions for rank-1 and rank-2 transmissions in Category 1, the first portion of TPMI can be used for port set selection and rank indication (e.g., $i_1$), and the second portion of TPMI can be used for co-phasing indication (e.g., $i_2$).

For Category 2 transmissions (i.e., four-antenna partial coherent transmissions), eight antenna ports are grouped into two coherent port sets. Port set 0 includes ports {0,1, 4,5} and port set 1 includes ports {2,3,6,7}. Because there are two ports in the same polarization in the same port set (e.g., port 0 and 4 have the same polarization), a Discrete Fourier Transform (DFT) vector can be used on the two ports with the same polarization to perform beamforming. Different DFT vectors can be used to form different beams.

Therefore, value $i_1$ can be split into two parts: $i_{11}$ and $i_{12}$, with $i_{11}$ indicating beam selections and $i_{12}$ indicating port selection. Typically, both $i_{11}$ and $i_{12}$ are wideband information indicators.

$$v_l = \begin{bmatrix} 1 & e^{j\frac{2\pi l}{ON}} & 1 & e^{j\frac{2\pi l}{ON}} \end{bmatrix}^T$$

$$p_0 = [1 \ 1 \ 0 \ 0]^T, p_1 = [0 \ 0 \ 1 \ 1]^T;$$

$$q_{l,t}(i) = v_l(i)p_t(i) = \begin{bmatrix} 1 \cdot p_t(0) & e^{j\frac{2\pi l}{ON}} \cdot p_t(1) & 1 \cdot p_t(2) & e^{j\frac{2\pi l}{ON}} \cdot p_t(3) \end{bmatrix}^T$$

$$\varphi_n = e^{j\pi n/2}$$

Here, value l of vector v corresponds to $i_{11}$, which is used for indicating beam selection. Value t of vector p corresponds to $i_{12}$, which is used for indicating port set selection. N represents the number of antenna ports with the same polarization and N=2. O represents the oversampling factor. $i_2$ is to indicate co-phasing among antenna ports with the same polarization within the same port set.

Table 5 shows the representative precoder W for rank-1 transmissions. Assuming O=2, two bits are needed for $i_{11}$ and one bit is needed for $i_{12}$ in the downlink control messages.

TABLE 5

Representative Rank-1 Transmitted Pre-coding Matrix Indicator

| Rank 1 | | | |
|---|---|---|---|
| $i_{11}$ | $i_{12}$ | $i_2$ | |
| 0, ... NO − 1 | 0, 1 | 0, 1, 2, 3 | $W_{i_{11},i_{12},i_2}$ |

$$\text{where } W_{l,t,n} = \frac{1}{\sqrt{M}} \begin{bmatrix} q_{l,t} \\ \varphi_n q_{l,t} \end{bmatrix}$$

TABLE 5-continued

Representative Rank-1 Transmitted Pre-coding Matrix Indicator

Rank 1

| $i_{11}$ | $i_{12}$ | $i_2$ |

E.g. $W_{l,0,n} = \begin{bmatrix} 1 & e^{j\frac{2\pi l}{ON}} & 0 & 0 & \varphi_n & \varphi_n \cdot e^{j\frac{2\pi l}{ON}} & 0 & 0 \end{bmatrix}^T$ $W_{l,1,n} = \begin{bmatrix} 0 & 0 & 1 & e^{j\frac{2\pi l}{ON}} & 0 & 0 & \varphi_n & \varphi_n \cdot e^{j\frac{2\pi l}{ON}} \end{bmatrix}^T$ Similar to Category 1, TPMI can be used for beam selection and port set selection (e.g., $i_{11}$ and $i_{12}$). TPMI can also be used for co-phasing indication (e.g., $i_2$).

In some embodiments, one $i_1$ value (wideband indication) and one $i_2$ value (indication for a selected sub-band) can be included in DCI_1. Remaining $i_2$ values for other sub-bands can be included in DCI_2. In other words, $i_2$ indications are split into two portions. When the UE fails to detect DCI_2 successfully, the $i_2$ value in DCI_1 is deemed as the wideband information used for all PUSCH PRBs. In other words, $i_2$ using the first set of sub-band indicators are also used for the second subset of sub-bands in the case when the UE fails to detect DCI_2. When the UE detects DCI_2 successfully, the $i_2$ value in DCI_1 can be used for one or more predefined sub-bands (e.g., the predefined sub-band which is the first set of sub-bands is the first sub-band, the last sub-band, or the sub-band in the middle within the scheduled PUSCH). The $i_2$ values in DCI_2 are used for remaining sub-bands.

In some implementations, the number of sub-band indications supported by DCI_1 is fixed or configured by higher layer signaling, while the number of scheduled PUSCH sub-bands changes dynamically. This can allow the payload size of DCI_1 to stay constant while reducing detection complexity on the UE side. When the number of $i_2$ values supported by DCI_1 is smaller than what the scheduled sub-bands need, scheduling indication for a subset of the scheduled sub-bands is included in DCI_2. For example, a total number of N PUSCH sub-bands are scheduled and DCI_1 supports T number of $i_2$ values. Therefore, DCI_2 only includes scheduling indication for the first (or last) N-T sub-bands. When the number of $i_2$ values supported by DCI_1 is larger than what the scheduled sub-bands need, a subset of $i_2$ values in DCI_2 becomes invalid or DCI_2 is not transmitted.

In some implementations, the number of sub-bands supported by DCI_2 can change semi-statically. For example, the number of $i_2$ values supported by DCI_2 can be configured by higher layer signaling, such as Radio Resource Control (RRC), Medium Access Control (MAC) Control Element (CE), or via the Physical Broadcast Channel (PBCH). This can allow the payload size of DCI_2 to change very slowly, thereby reducing detection complexity on the UE side. In some embodiments, the number of sub-band indications supported by DCI_2 can change dynamically. The number of $i_2$ values supported by DCI_2 is configured by DCI_1. For example, DCI_2 can support either 1, 2, 3, or 4 sub-bands. DCI_1 can include a two-bit field to indicate how many sub-bands is supported by DCI_2. In some embodiments, the number of sub-bands support by DCI_2 is determined based on the number of PUSCH sub-bands. For example, the number of PUSCH sub-bands is 3, thus the number of sub-bands supported by DCI_2 is dynamically adjusted to 3−1=2 (note that DCI_1 includes one $i_2$ value for a selected sub-band). If there is no $i_2$ indication in DCI_1, thus the number of $i_2$ indications in DCI_2 is equal to the number of PUSCH sub-bands.

However, too many candidates of DCI_2 payload sizes can be introduced because there are many candidates of the number PUSCH-subbands. In some implementations, the number of sub-bands supported by DCI_2 is variable and can be selected from a predetermined set. In other words, the candidate values of the number of sub-band indicators in DCI_2 are limited and fewer than the candidates of the number PUSCH-subbands. When the number of PUSCH sub-bands is different from any of the values in the set, the base station can select a closest value to the number of PUSCH sub-bands from the set. For example, the number of sub-band indications ($i_2$ values) supported by DCI_2 can be any value from the set {2, 4, 8, 16}. If the number of PUSCH sub-bands is 10 and the base station knows that DCI_1 includes the scheduling indication for one sub-band, and there are 9 sub-bands remaining. The base station then picks the value (e.g., 8) in the set that is closest (e.g., numerically closest) to 9 for the number of $i_2$ values in DCI_2.

In some implementations, the base station selects a closest value that is greater than or equal to (or smaller than) the number of PUSCH sub-bands when the number of PUSCH sub-bands is different from any of the values in the set. For example, the number of sub-band indications supported by DCI_2 can be any value from the set {2, 4, 8, 16}. The number of PUSCH sub-bands is 6. The base station knows that DCI_1 includes the scheduling indication for one sub-band, and there are 5 sub-bands remaining. Yet, the base station picks value 8 because it is the closest value to 5 among the values that are greater than or equal to 5. In some embodiments, the candidate numbers of sub-band indicators $i_2$ is a subset of the candidate numbers of PUSCH sub-bands, thereby further reducing the candidate number of DCI_2 payload sizes and reducing detection complexity on the UE side.

In some embodiments, the number of sub-band indicators in the second set is determined based on the number of scheduled resources in frequency domain in the transmission band and a number of sub-band indicators in the first set. When the number of PUSCH sub-bands is smaller than or equal to a threshold T, the scheduling indication for all the sub-bands can be included in DCI_1. There is no need to transmit DCI_2 for sub-band scheduling indication. When the number of PUSCH sub-bands is larger than T (e.g., S>T), the scheduling indication for the wideband and the first T sub-band indications can be included in DCI_1. The scheduling indication for the remaining S-T sub-bands can be included in DCI_2. T can be fixed value or semi-statically configured. In some embodiments, T can be configured with a larger value, for example T=6. When the number of scheduled PUSCH sub-bands are fewer than 7, there is no need to transmit DCI_2, thereby reducing signaling overhead. In some embodiments, DCI_1 includes only one $i_1$ value and no $i_2$ value. All $i_2$ values for different sub-bands can be included in DCI_2. When the UE receives DCI_2 successfully, the second portion of the TPMI in DCI_2 (e.g., $i_2$ values) are used accordingly for each sub-band. When the UE fails to receive DCI_2 successfully, the UE can determine the proper $i_2$ value(s) based on a set of pre-determined rules. For example, the UE can randomly select a value for $i_2$ from a set of candidate $i_2$ values. In some implementations, the UE can cycle between different $i_2$ values for different sub-bands. For example, for scheduled sub-bands 0 to 5 and the candidate $i_2$ values are 0, 1, 2, 3. The UE can cycle through the candidate $i_2$ values to obtain {0, 1, 2, 3, 0, 1} for all six sub-bands.

In some embodiments, DCI_1 includes several $i_2$ values (e.g. K number of $i_2$ vales) for the first subset of sub-bands. When the number of sub-band $i_2$ indications in DCI_1 is smaller than what the scheduled PUSCH needs and UE fails to detect DCI_2, a value of $i_2$ is selected from a set of candidate indicator values for each of the second subset of sub-bands. The set of candidate indicator values can be known a priori to the mobile device or can be configured by a higher-layer signaling message. The entire PUSCH frequency resources are split into two subsets which correspond to the first subset and the second subset of sub-bands. In some implementations, the UE can cycle between different $i_2$ values for different sub-bands of the second subset. In some implementations, the UE can randomly select a value for $i_2$ from a set of candidate $i_2$ values for different sub-bands of the second subset.

In some embodiments, DCI_1 includes several $i_2$ values (e.g., K number of $i_2$ values) for the first subset of sub-bands. When the number of sub-band i2 indications in DCI_1 is smaller than what the scheduled PUSCH needs and UE fails to detect DCI_2, the first set of sub-band indicators ($i_2$) is used as the second subset of sub-bands. The entire PUSCH frequency resources are split into two subsets which correspond to the first subset and the second subset of sub-bands. For example, a sub-band of the second subset uses $i_2$ value of the nearest sub-band in the first subset.

Example Embodiment 8

This embodiment describes techniques that can be used for non-codebook base transmissions. The discussion in this embodiment focuses on techniques of signaling resources used for SRS transmissions to facilitate precoder determinations. However, the techniques can also be applied to signal resources used for other types of reference signals.

To support sub-band indications, the SRI field can have two categories of information: the first category can indicate rank information for the wideband and resource(s)/resource group(s) for a subset of sub-bands, and the second category can indicate resource(s)/resource group(s) for remaining sub-bands. The number of bits needed for the second portion is smaller because rank information is already included in the first portion.

For example, the SRI field in DCI_1 includes information to indicate the global SRS resource(s) or SRS resource groups(s). The SRI field in DCI_2 includes information of the second category to indicate the local SRS resource(s) or SRS resource group(s). The global SRS resource(s) or SRS resource group(s) can be used for transmissions in all the ranks that the UE supports. The local SRS resource(s) or SRS resource group(s) can only be used for transmissions in a particular rank (e.g., rank R). The rank value is obtained based on the information in DCI_1.

For transmissions in rank-R, the base station can determine $N_R$ number of candidate resource groups among M number of configured resources in a resource set, where $1 \leq R \leq M$. The value of M is determined based on the number of antenna ports supported: it can be four, six, or eight; its value can also be extended to greater than eight for future generations of mobile devices. Each reference group includes R number of resources, and $N_R < C_M^R$. The $N_R$ candidate groups can be predetermined, or signaled to the UE via higher layer signaling.

In DCI_1, the number of bits for the SRI field can be $\log_2(\Sigma_{i=1}^{R\ max} N_i)$, where $R_{max}$ is the maximum number of antenna ports supported by the UE. After the UE receives DCI_1 successfully, the UE can continue to detect DCI_2. In DCI_2, the number of bits for the SRI field can be $\log_2(N_{R_{max}})$ for each sub-band. DCI_1 indicates wideband SRS resources, while DCI_2 indicates sub-band SRS resources.

In some embodiments, one TRI (wideband indication) and one SRI (indication for a selected sub-band) can be included in DCI_1. Remaining SRI values for other sub-bands can be included in DCI_2. When the UE fails to detect DCI_2 successfully, the SRI value in DCI_1 is deemed as the wideband information used for all PUSCH PRBs. When the UE detects DCI_2 successfully, the SRI value in DCI_1 can be used for a predefined sub-band (e.g., the first sub-band, the last sub-band, or the sub-band in the middle). The SRI values in DCI_2 are used for remaining sub-bands.

In some implementations, the number of sub-band indications supported by DCI_1 is fixed or configured by higher layer signaling. When the number of SRI values supported by DCI_1 is smaller than the what the scheduled PUSCH sub-bands need, DCI_2 is transmitted and scheduling indication for a subset of the scheduled sub-bands is included in DCI_2. For example, DCI_1 supports T number of SRI values and N PUSCH sub-bands are scheduled. Therefore, DCI_1 only includes scheduling indication for the first (or last) T sub-bands, and the remaining N-T SRIs are indicated in DCI_2. When the number of SRI values supported by DCI_1 is larger than what the scheduled sub-bands need, a subset of SRI values in DCI_2 becomes invalid or DCI_2 will not be transmitted.

In some implementations, the number of sub-bands supported by DCI_2 changes semi-statically or changes dynamically. For example, the number of SRI values supported by DCI_2 can be configured by higher layer signaling, such as Radio Resource Control (RRC), Medium Access Control (MAC) Control Element (CE), or via the Physical Broadcast Channel (PBCH). In some embodiments, the number of sub-bands supported by DCI_2 can be indicated by DCI_1. For example, DCI_2 can support either 1, 2, 3, or 4 sub-bands. DCI_1 can include a two-bit field to indicate how many sub-bands is supported by DCI_2. In some embodiments, the number of sub-bands support by DCI_2 is determined based on the actual number of PUSCH sub-bands. For example, the number of PUSCH sub-bands is 3, thus the number of sub-bands supported by DCI_2 is dynamically adjusted to 3−1=2 (note that DCI_1 includes one SRI value for a selected sub-band). In some implementations, the number of SRIs in the second set is determined based on the number of scheduled resources in frequency domain in the transmission band and a number of SRIs in the first set.

In some implementations, the number of SRIs supported by DCI_2 is variable and can be selected from a predetermined set. When the number of PUSCH sub-bands is different from any of the values in the predetermined set, the base station can select a closest value. For example, the number of sub-bands supported by DCI_2 can be any value from the set {2, 4, 8, 16}. The number of PUSCH sub-bands is 10. The base station knows that DCI_1 includes scheduling indication for one sub-band, and there are 9 sub-bands remaining. The base station then picks the value (i.e., 8) in the set that is closest to 9.

In some implementations, the base station selects a closest value that is greater (smaller) than or equal to the number of PUSCH sub-bands when the number of PUSCH sub-bands is different from any of the values in the set. For example, the number of sub-bands supported by DCI_2 can be any value from the set {2, 4, 8, 16}. The number of PUSCH sub-bands is 6. The base station knows that DCI_1 includes scheduling indication for one sub-band, and there are 5 sub-bands remaining. Yet, the base station picks value 8 because it is the closest value to 5 among the values that are greater than or equal to 5.

In some embodiments, DCI_1 only includes a TRI value. SRI values for all the sub-bands can be included in DCI_2. When the UE receives DCI_2 successfully, the second portion of the TPMI in DCI_2 are used accordingly for each sub-band. When the UE fails to receive DCI_2 successfully, the UE can determine the proper scheduling indication based on a set of pre-determined rules. For example, the UE can randomly select a value for SRI from a set of candidate values. In some implementations, the UE can cycle between different SRI values for different sub-bands. For example, for scheduled sub-bands 0 to 5 and the candidate SRI values are 0, 1, 2, 3. The UE can cycle through the candidate SRI values to obtain {0, 1, 2, 3, 0, 1} for all six sub-bands. It is noted that solutions for codebook based transmission can also be used for non-codebook based transmission.

Long-Term and Short-Term Scheduling Indication

The scheduling indication can be partitioned based on how often a particular type of scheduling indication changes. A scheduling indication that changes more frequently can be considered as a short-term scheduling indication, and a scheduling indication that does not change frequently can be considered as a long-term scheduling indication. DCI_1 can include short-term scheduling indications, and DCI_2 can include long-term scheduling indications. The base station can choose to transmit DCI_2 only when the long-term scheduling indication changes, thereby reducing signaling overhead. When the UE fails to receive the DCI_2 successfully, the UE can assume that the long-term scheduling indication has not changed and use the value for the last scheduled slot.

In some embodiments, a rank range or a rank group is deemed as a long-term scheduling indication and can be included in DCI_2. The specific rank in a rank range or a rank group changes more frequently, and thus is deemed as a short-term scheduling indication included by DCI_1. If the UE fails to detect DCI_2 successfully (e.g., no DCI_2 is detected within a predetermined period of time), the UE can assume that the rank range or the rank group has not changed, and use the value(s) for the last scheduled slot which includes DCI_2. If the UE detects DCI_2 successfully, the rank range or the rank group is determined based on DCI_2. For example, candidates of rank range include [1,2] and [3,4]. DCI_2 includes one bit to indicate which candidate is selected. DCI_1 includes one bit to select a particular rank value from the selected candidate. Because the rank range is a long-term scheduling indication, the base station does not need to transmit DCI_2 for every scheduling slot.

For codebook based transmissions, the port set selection value (i.e., $i_1$) may not undergo frequency changes. The $i_1$ value thus can be included in DCI_2. When the UE fails to detect DCI_2 successfully, the UE can assume that the port set selection has not changed and use the $i_1$ value in the last scheduled slot.

For non-codebook based transmissions, global SRI and/or TRI are deemed as a long-term scheduling indication and can be included in DCI_2. Other precoder indications are deemed as short-term scheduling indications and are included in DCI_1. If the UE fails to detect DCI_2 successfully (e.g., no DCI_2 is detected within a predetermined period of time), the UE can assume that the global SRT and/or TRI has not changed and use the value for the last scheduled slot.

Granularity in Scheduling Indication

The scheduling indication can be partitioned based on the granularity of a particular type of scheduling indication. For example, the co-phasing values for Binary Phase Shifting Key (BPSK) modulation include two values {1, −1}. Thus, BPSK co-phasing values can be considered as "coarse" scheduling indication and included in DCI_1. For example, DCI_1 can include one bit to indicate co-phasing values for BPSK. The co-phasing values for Quadrature Phase Shifting Key (QPSK) modulation, on the other hand, have higher granularity. DCI_2 can include two bits to indicate co-phasing values for QPSK. Alternatively, indication of QPSK co-phasing values can leverage DCI_1. For example, DCI_2 includes one bit to indicate co-phasing values. Combining the one bit in DCI_1, the two bits together can indicate co-phasing values for QPSK. When the UE detects DCI_2 successfully, the UE can determine the co-phasing value based on the combined two bits in both DCI_1 and DCI_2. When the UE fails to detect DCI_2 successfully, the single bit in DCI_1 provides "coarse" scheduling indication for transmissions (that is, a range of co-phasing values instead of a specific co-phasing value). Other types of scheduling indication, such as the port set or port set group selection, the beam indication, the resource/resource group indication, MCS, DMRS port indication can also be partitioned based on granularity of the scheduling indication. In other words, the first portion of scheduling information in DCI_1 can be used to indicate a set of candidate values for a particular scheduling parameter, and the second portion of the scheduling indication in DCI_2 can be used to indicate a specific value selected from the set of candidate values. If UE fails to detect DCI_2, a predefined set of candidate values (e.g., the first value) is used.

For example, for codebook based transmission, $i_1$ for port set selection in DCI_1 is used to indicate a set of port sets or port set groups, $i_1$ in DCI_2 is used to further select one value from the set which indicated by $i_1$. Table 6 shows some representative $i_1$ values. The candidates of $i_1$ in DCI_1 include the following sets: $i_1$={0,1}, {2,3}, {4,5}, . . . , {14, 15}. Accordingly, 8 different values of $i_1$ and 3 bits are needed in DCI_1. In DCI_2, one bit of $i_1$ for wideband or each sub-band can be used to further indicate which value within the set (e.g., which value within set{0,1}). The final $i_1$ value is equal to $i_1$ in DCI_1+$i_1$ in DCI_2. For example, the final $i_1$ can be any one of the candidates shown in Table 6. If UE fails to detect DCI_2, the first value of the indicated set by $i_1$ is used. For example, $i_1$=0 means the port set 0 or 1, and $i_2$=1 is to choose the value 1 in the port set {0,1}. if DCI_2 is not detected successfully, port set 0 is used.

TABLE 6

Representative $i_1$ values

| i1 value | Port set | rank |
|---|---|---|
| 0 | 0 | 1 |
| 1 | 1 | 1 |
| 2 | 2 | 1 |
| 3 | 3 | 1 |
| 4 | 0,1 | 2 |
| 5 | 0,2 | 2 |
| 6 | 0,3 | 2 |
| 7 | 1,2 | 2 |
| 8 | 1,3 | 2 |
| 9 | 2,3 | 2 |
| 10 | 0,1,2 | 3 |
| 11 | 0,1,3 | 3 |
| 12 | 0,2,3 | 3 |

TABLE 6-continued

Representative $i_1$ values

| i1 value | Port set | rank |
|---|---|---|
| 13 | 1,2,3 | 3 |
| 14 | 0,1,2,3 | 3 |
| 15 | reserved | reserved |

Figure 4:
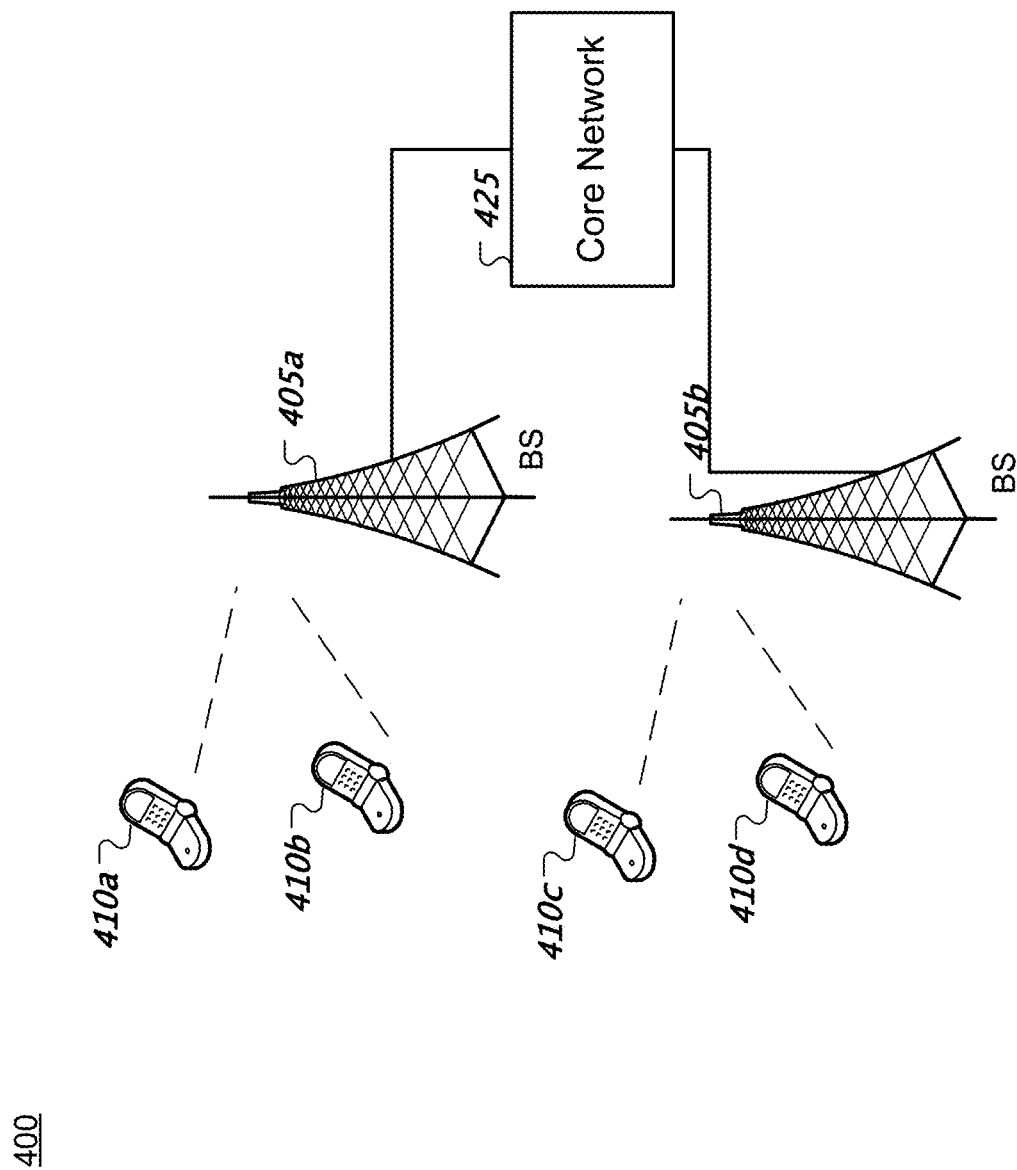
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
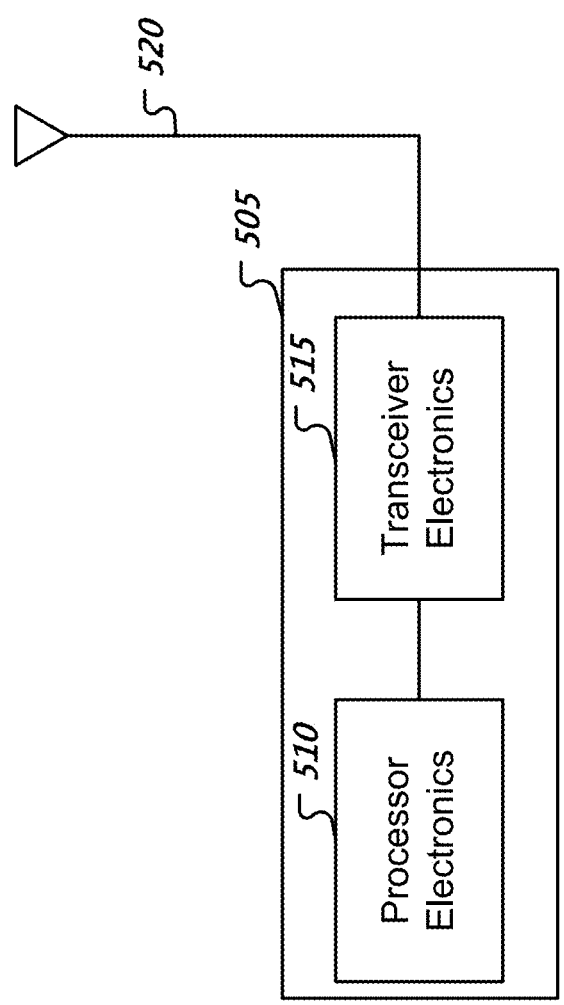
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It is thus evident that methods and corresponding apparatus related to a two-stage transmission of downlink control messages are disclosed. The disclosed techniques can be implemented in various embodiments to obtain the scheduling indication based on a single DCI message when the second DCI message fails to be transmitted successfully. Using the disclosed techniques, transmission and/or re-transmission rate of the second DCI message can be reduced, thereby reducing signaling overhead on the downlink control channel(s).

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for wireless communication, comprising:
   receiving, at a mobile device, a first message from a wireless communication node, the message including a first portion of a scheduling indication for scheduling a transmission;
   determining, by the mobile device, a second portion of the scheduling indication in response to detecting a failure of reception of the second portion from the wireless communication node, the failure of reception indicating one of (a) a non-reception of a second message that includes the second portion within a predetermined time interval, or (b) a reception error for receiving the second message that includes the second portion;
   determining, by the mobile device, the scheduling indication based on the first portion of the scheduling indication included in the message and the second portion of the scheduling indication; and
   performing, by the mobile device, the transmission based on the scheduling indication,
   wherein:
   (1) the transmission is to be performed on a frequency band that includes multiple sub-bands, the first portion of the scheduling indication includes wideband information for the frequency band, and the second portion of the scheduling indication includes sub-band indicators for all the multiple sub-bands, each of the sub-band indicators indicating a scheduling parameter for scheduling the transmission to occur in a corresponding sub-band;
   (2) the first portion of the scheduling indication includes information that changes frequently in time domain, and the determining the second portion of the scheduling indication comprises: determining the second portion of the scheduling indication based on a scheduling parameter for a previous slot in a time domain; or
   (3) the first portion of the scheduling indication includes information for indicating a set of candidate values for a scheduling parameter, and the second portion of the scheduling indication includes information for selecting a value from the set of candidate values for the scheduling parameter.

2. The method of claim 1, wherein the scheduling indication includes one or more of at least one of the following: a precoder indication, a Modulation and Coding Scheme (MCS) index, a Redundancy Version (RV) indicator, a New Data Indicator, a Code Block Group Transmission Information (CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request, and wherein the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

3. The method of claim 1, wherein the transmission is to be performed on the frequency band that includes the multiple sub-bands, wherein the first portion of the scheduling indication includes wideband information for the frequency band, and wherein the second portion of the scheduling indication includes the sub-band indicators for all the multiple sub-bands, each of the sub-band indicators indicating the scheduling parameter for scheduling the transmission to occur in the corresponding sub-band.

4. The method of claim 3, wherein the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band.

5. The method of claim 1, wherein the first portion of the scheduling indication includes the information that changes frequently in the time domain, and wherein the determining the second portion of the scheduling indication comprises:
   determining the second portion of the scheduling indication based on the scheduling parameter for the previous slot in the time domain.

6. The method of claim 1, wherein the first portion of the scheduling indication includes the information for indicating the set of candidate values for the scheduling parameter, and the second portion of the scheduling indication includes the information for selecting the value from the set of candidate values for the scheduling parameter.

7. A method for wireless communication, comprising:
  determining, by a wireless communication node, a first portion of a scheduling indication, wherein the scheduling indication is for scheduling a transmission;
  transmitting, from the wireless communication node, a first message to a mobile device, the first message including the first portion of the scheduling indication; and
  receiving, at the wireless communication node, a transmission from the mobile device according to the scheduling indication, wherein the scheduling indication is obtained based on combining the first portion of the scheduling indication included in the message and a second portion of the scheduling indication that is determined in response to a failure of reception of the second portion by the mobile device, the failure of reception indicating one of (a) a non-reception of a second message that includes the second portion within a predetermined time interval, or (b) a reception error for receiving the second message that includes the second portion,
  wherein at least one of the following is satisfied:
  (1) the transmission is to be performed on a frequency band that includes multiple sub-bands, the first portion of the scheduling indication includes wideband information for the frequency band, and the second portion of the scheduling indication includes sub-band indicators for all the multiple sub-bands, each of the sub-band indicators indicating a scheduling parameter for scheduling the transmission to occur in a corresponding sub-band;
  (2) the first portion of the scheduling indication includes information that changes frequently in time domain, and the determining the second portion of the scheduling indication comprises: determining the second portion of the scheduling indication based on a scheduling parameter for a previous slot in a time domain; or
  (3) the first portion of the scheduling indication includes information for indicating a set of candidate values for a scheduling parameter, and the second portion of the scheduling indication includes information for selecting a value from the set of candidate values as an indicator for the scheduling parameter.

8. The method of claim 7, wherein the scheduling indication includes one or more of at least one of the following: a precoder indication, a Modulation and Coding Scheme (MCS) index, a Redundancy Version (RV) indicator, a New Data Indicator, a Code Block Group Transmission Information(CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request, and
  wherein the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

9. The method of claim 7, wherein the transmission is to be performed on the frequency band that includes the multiple sub-bands, wherein the first portion of the scheduling indication includes the wideband information for the frequency band, and wherein the second portion of the scheduling indication includes the sub-band indicators for all the multiple sub-bands, each of the sub-band indicators indicating the scheduling parameter for scheduling the transmission to occur in corresponding sub-band.

10. The method of claim 9, wherein the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band.

11. The method of claim 7, wherein the first portion of the scheduling indication includes the information that changes frequently in the time domain, and wherein the second portion of the scheduling indication is determined based on the scheduling parameter for the previous slot in the time domain.

12. The method of claim 7, wherein the first portion of the scheduling indication includes the information for indicating the set of candidate values for the scheduling parameter, and the second portion of the scheduling indication includes the information for selecting the value from the set of candidate values as the indicator for the scheduling parameter.

13. An apparatus for wireless communication comprising a processor that is configured to:
  receive a first message from a wireless communication node, the message including a first portion of a scheduling indication for scheduling a transmission;
  determine a second portion of the scheduling indication in response to detecting a failure of reception of the second portion from the wireless communication node, the failure of reception indicating one of (a) a non-reception of a second message that includes the second portion within a predetermined time interval, or (b) a reception error for receiving the second message that includes the second portion;
  determine the scheduling indication based on the first portion of the scheduling indication included in the message and the second portion of the scheduling indication; and
  perform the transmission based on the scheduling indication,
  wherein:
  (1) the transmission is to be performed on a frequency band that includes multiple sub-bands,
    the first portion of the scheduling indication includes wideband information for the frequency band, and the second portion of the scheduling indication includes sub-band indicators for all the multiple sub-bands, each of the sub-band indicators indicating a scheduling parameter for scheduling the transmission to occur in a corresponding sub-band, and
    the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band; or
  (2) the first portion of the scheduling indication includes information for indicating a set of candidate values for a scheduling parameter, and the second portion of the scheduling indication includes information for selecting a value from the set of candidate values for the scheduling parameter.

14. The apparatus of claim 13, wherein the scheduling indication includes one or more of at least one of the following: a precoder indication, a Modulation and Coding Scheme (MCS) index, a Redundancy Version (RV) indicator, a New Data Indicator, a Code Block Group Transmission Information (CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request, and wherein the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

15. The apparatus of claim 13, wherein the transmission is to be performed on a frequency band that includes multiple sub-bands,
   wherein the first portion of the scheduling indication includes the wideband information for the frequency band, and the second portion of the scheduling indication includes the sub-band indicators for all the multiple sub-bands, each of the sub-band indicators indicating the scheduling parameter for scheduling the transmission to occur in the corresponding sub-band, and
   wherein the first portion of the scheduling indication further includes the first set of sub-band indicators for the first subset of sub-bands, and the second portion of the scheduling indication includes the second set of sub-band indicators for a second subset of sub-bands, each of the sub-band indicators indicating the scheduling parameter for scheduling the transmission to occur in the corresponding sub-band.

16. The apparatus of claim 13, wherein the first portion of the scheduling indication includes information for indicating the set of candidate values for the scheduling parameter, and the second portion of the scheduling indication includes the information for selecting the value from the set of candidate values for the scheduling parameter.

17. An apparatus for wireless communication comprising a processor that is configured to:
   determine a first portion of a scheduling indication, wherein the scheduling indication is for scheduling a transmission;
   transmit a first message to a mobile device, the first message including the first portion of the scheduling indication; and
   receive a transmission from the mobile device according to the scheduling indication, wherein the scheduling indication is obtained based on combining the first portion of the scheduling indication included in the message and a second portion of the scheduling indication that is determined in response to a failure of reception of the second portion by the mobile device, the failure of reception indicating one of (a) a non-reception of a second message that includes the second portion within a predetermined time interval, or (b) a reception error for receiving the second message that includes the second portion,
   wherein:
   (1) the transmission is to be performed on a frequency band that includes the multiple sub-bands,
      the first portion of the scheduling indication includes wideband information for the frequency band, and the second portion of the scheduling indication includes sub-band indicators for all the multiple sub-bands, each of the sub-band indicators indicating a scheduling parameter for scheduling the transmission to occur in a corresponding sub-band, and
      the first portion of the scheduling indication further includes a first set of sub-band indicators for a first subset of sub-bands, and the second portion of the scheduling indication includes a second set of sub-band indicators for a second subset of sub-bands, each of the sub-band indicators indicating a scheduling parameter for scheduling the transmission to occur in a corresponding sub-band; or
   (2) the first portion of the scheduling indication includes information for indicating a set of candidate values for a scheduling parameter, and the second portion of the scheduling indication includes information for selecting a value from the set of candidate values as an indicator for the scheduling parameter.

18. The apparatus of claim 17, wherein the scheduling indication includes one or more of at least one of the following: a precoder indication, a Modulation and Coding Scheme (MCS) index, a Redundancy Version (RV) indicator, a New Data Indicator, a Code Block Group Transmission Information(CBGTI), an indicator for a Phase-Tracking Reference Signal (PTRS) and Demodulation Reference Signal (DMRS) association, an indicator for a Channel State Information (CSI) request, or an indicator for a Sounding Reference Signal (SRS) request, and
   wherein the precoder indication comprises at least one of the following: an indicator for a port set selection, an indicator for a port set group selection, an indicator for a beam selection, an indicator for a co-phasing value, a Sounding Reference Signal Resource Indicator (SRI), or a Transmitted Rank Indicator (TRI).

19. The apparatus of claim 17, wherein the transmission is to be performed on the frequency band that includes the multiple sub-bands,
   wherein the first portion of the scheduling indication includes the wideband information for the frequency band, and the second portion of the scheduling indication includes the sub-band indicators for all the multiple sub-bands, each of the sub-band indicators indicating the scheduling parameter for scheduling the transmission to occur in corresponding sub-band, and
   wherein the first portion of the scheduling indication further includes the first set of sub-band indicators for the first subset of sub-bands, and the second portion of the scheduling indication includes the second set of sub-band indicators for the second subset of sub-bands, each of the sub-band indicators indicating the scheduling parameter for scheduling the transmission to occur in the corresponding sub-band.

20. The apparatus of claim 17, wherein the first portion of the scheduling indication includes the information for indicating the set of candidate values for the scheduling parameter, and the second portion of the scheduling indication includes information for selecting the value from the set of candidate values as the indicator for the scheduling parameter.

* * * * *